Oct. 31, 1967  J. F. GRUNDMANN  3,349,801
VALVE ARRANGEMENT
Filed Sept. 13, 1965  3 Sheets-Sheet 1

INVENTOR
JOHN F. GRUNDMANN
BY Don Finkelstein
ATTORNEY

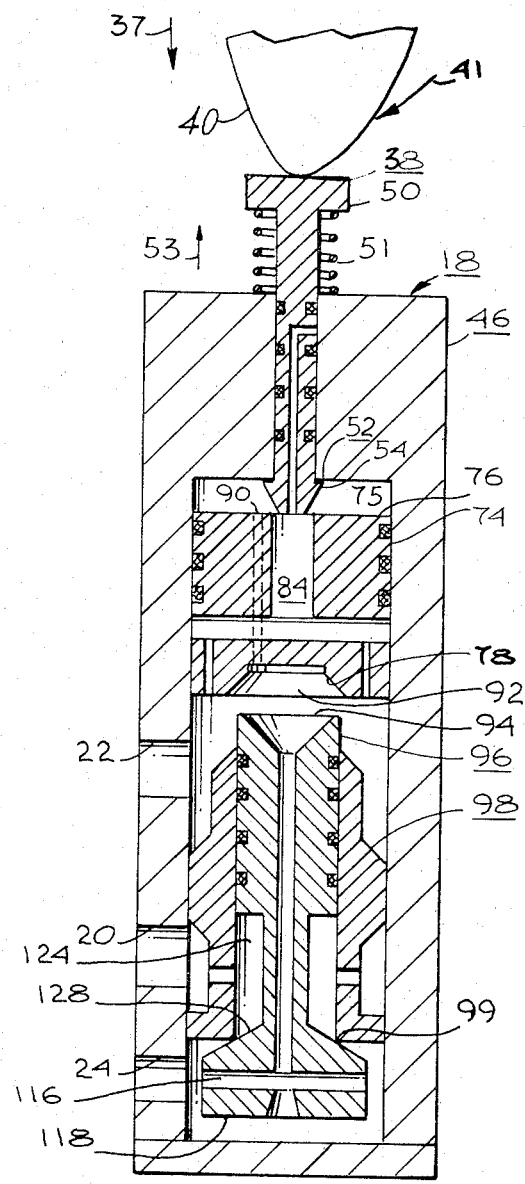
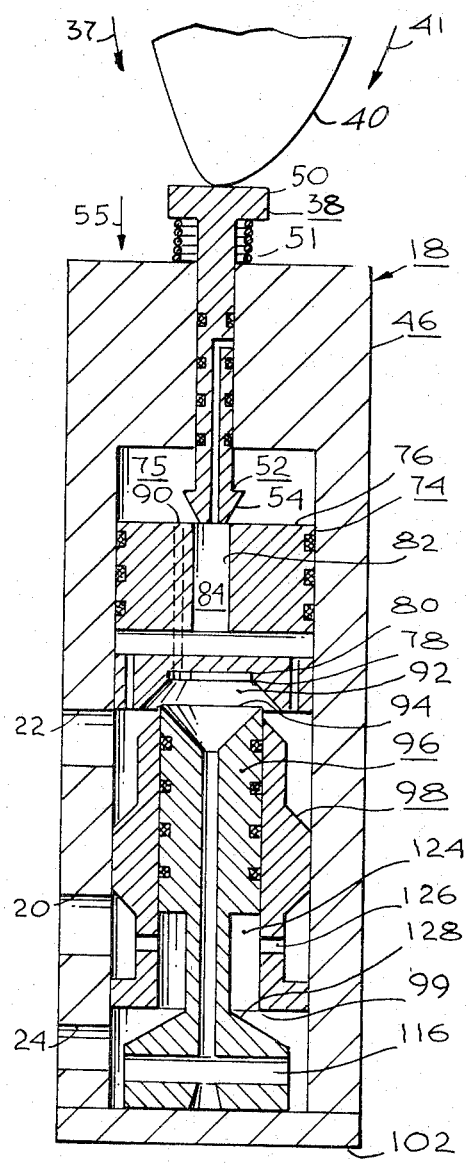
Fig. 3
Fig. 4

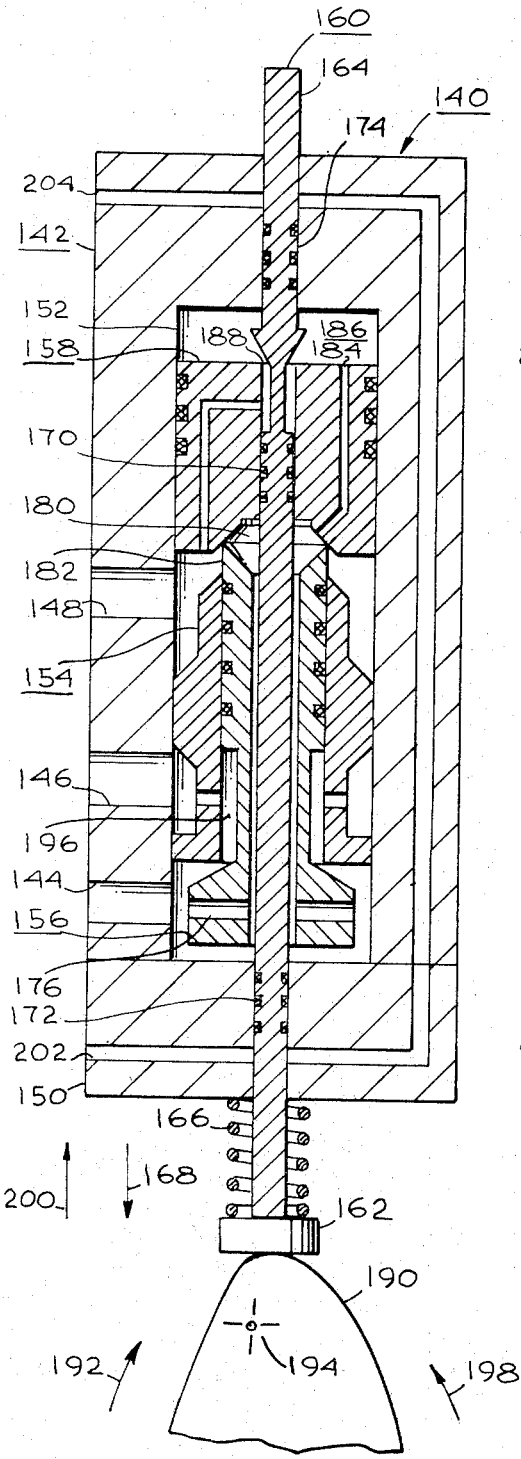
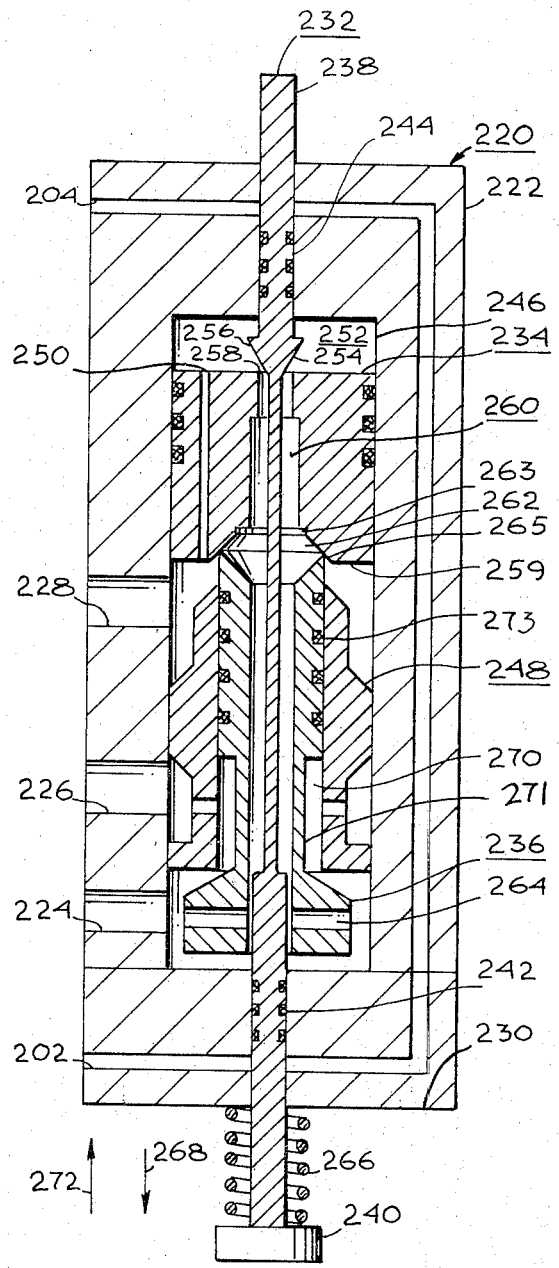
Fig. 5
Fig. 6

United States Patent Office 3,349,801
Patented Oct. 31, 1967

3,349,801
VALVE ARRANGEMENT
John F. Grundmann, Los Angeles, Calif.
(651 S. Irena Ave., Redondo Beach, Calif. 90277)
Filed Sept. 13, 1965, Ser. No. 486,667
19 Claims. (Cl. 137—627.5)

This invention relates to the valve art and more particularly to an improved fluid servo-control valve configuration.

Increased utilization of parts having complex geometric forms of great precision, machined from harder and tougher materials, has resulted in the requirement for means to control accurately the large forces driving the machine tools producing these parts. Mobile vehicles of great size and power, likewise, require suitable control elements to direct the forces involved in their motion. In cases such as these, where the apparatus is hydraulically operated, it is desirable that the large forces involved be responsive to comparatively small control forces and motions. These control forces and motions may be supplied to a control or servo-valve mechanism by means of a soft, easily worked template or pattern of the geometric form to be produced, by electro-mechanical devices, or other signal producing apparatus.

Further, increased utilization of higher fluid pressures in various servo-control systems has necessitated utilization of highly accurate servo-control valves that are capable of withstanding such high pressures and still providing precise control at the high pressures.

To the best of the applicant's knowledge, these desiderata have not generally been provided in servo-control valves utilized in the prior art. Furthermore, prior art valves, once produced, are often susceptible to malfunction, due to contaminates in the hydraulic fluid becoming lodged in the extremely small clearances between valve components needed to provide the valve's accuracy; or are due to non-uniform mechanical deflection of the valve components at higher pressures causing binding of components because of these small clearances, or again, are due to the failure of the valve to accommodate thermal variations of fluid viscosity with reasonable repeatability of accuracy.

Still further, the extremely small clearances between components of such valves required that the components be specially sized, or matched, for each individual valve rendering them non-interchangable from one valve to another. Additionally, long use of prior art valves results in wear of components which increased the vital clearances and impaired accuracy. In some cases, prior art valves have been supplied with supplementary reciprocating motion known as "dither," built in to overcome inertia of the valve components and also because of inability to manufacture parts with sufficiently small clearances required for accuracy of control.

Therefore, it is an object of applicant's invention herein to provide an improved servo-control valve.

It is another objective of applicant's invention to provide a servo-control valve having great accuracy of operation.

It is another objective of the applicant's invention herein to provide a servo-control valve having critical clearances on the order of those presently available in mass production technique.

It is still another objective of the applicant's invention herein to provide a servo-control valve whose components can be reasonably manufactured to be interchangeable from one valve to another.

It is yet another object of applicant's invention herein to provide an improved fluid servo-control valve in which comparatively small motions of the valve mechanism provide complete control over the system to be controlled.

The above and other objects are achieved, according to one embodiment of applicant's invention, by providing, in a valve body having a reservoir port, a pressure port and actuator port, a poppet means slidingly mounted in the valve body for reciprocal motion. Under certain conditions of valve operation, the poppet means is adapted to sealingly engage the valve body and thereby seal the pressure port from the actuator port. The poppet means has a passageway therethrough providing communication between a first end of the poppet means in communication with the actuator port and the second end of the poppet means remote therefrom.

A spool means is also slidingly mounted in the valve body for reciprocal motion and has a first end adjacent the second end of the poppet and, under certain conditions of valve operation sealingly engage the second end of the poppet means and thereby seal the second end of the poppet means, the passageway communicating the first end of the poppet means with the second end of the poppet means and the actuator port from the reservoir port, except for a predetermined bleed flow, as described below.

The spool means is provided with a bleed orifice therethrough providing communication between the first end of the spool means, that is adjacent to the second end of the poppet means, with the second end of the spool means which is remote therefrom and together with interior wall portions of the valve body defines a chamber. An aperture in the second end of the spool means provides communication between the second end of the spool means, and consequently, the chamber, and the reservoir port. This aperture in the second end of the spool means is spaced apart from the bleed orifice that provides communication between the second end of the spool means and the first end of the spool means and the aperture is in communication with the reservoir port. Therefore, bleed orifice flow is permitted, under certain operation conditions, between the actuator port and the reservoir port. Under other operational conditions, the spool means is adapted to be moved away from sealing engagement with the second end of the poppet means and thereby allow direct fluid flow from the actuator port through the passageway in the poppet means to the reservoir port.

Also, under certain operational conditions of the valve, the spool means is adapted to move the poppet means and allow direct communication between the actuator port and the pressure port.

A stem means is also slidingly mounted in the valve body for reciprocal motion therein and is adapted to be spaced from the aperture in the second end of the spool means which is adjacent to the closed chamber defined by the valve body and the second end of the spool means, under certain operational conditions of the valve, and to move away from such spaced relationship under other operational conditions.

It is evident, then, from this description, that actuator port pressure and fluid is communicated from the actuator port in the valve body to the first end of the poppet means, through the passageway in the poppet means to the second end of the poppet means and the first end of the spool means, which is adjacent to the second end of the poppet means, through the bleed orifice in the spool means to the second end of the spool means and thereby into the closed chamber defined by the second end of the spool means and the valve body wherein the stem means may have a spaced relationship with the aperture in the second end of the spool means communicating with the reservoir port.

In a neutral position of the valve, the actuator pressure and fluid is in communication with the reservoir port through the bleed orifice, as noted above. The relationship of the stem means and aperture in the second end of the spool means, in the neutral position, is commensurate, with the flow through the bleed orifice in the spool means and is that spacing necessary to maintain the spool means in sealed relationship with the second end of the poppet means. The poppet means is not quite in sealed relationship with the valve body, in the neutral position, but is slightly spaced therefrom permitting only that pressure port to actuator port fluid flow necessary to supply that fluid volume flowing through the bleed orifice, into the chamber, out through the aperture of the spool means and to the reservoir port. The spool means retains this position because the pressure-area relationship on the first end of the spool means exactly counterbalances the pressure-area relationship on the second end of the spool means.

A first position of the valve is obtained when the stem means is moved, or retracted, to a position spaced apart from the spool means and providing greater flow through the aperture in the second end of the spool means than is commensurate with the flow through the bleed orifice, thereby reducing the pressure on the second end of the spool means. The spool means is therefore urged toward the retracted stem means by the pressure-area relationship of the first end of the spool means being greater than the pressure-area relationship of the second end of the spool means. This displacement of the spool means toward the retracted stem means in the first position of the valve moves the spool means out of sealing engagement with the second end of the poppet means, thus providing a direct fluid flow path from the actuator port to the reservoir port through the passageway in the poppet means. The pressure drop from the first end of the poppet means, through the passageway, to the second end of the poppet means insures that the pressure-area relationship of the first end of the poppet is greater than the pressure-area relationship of the second end of the poppet, providing that the poppet means is in sealing engagement with the valve body, the poppet means being in pressure balance with respect to the pressure port at all times, thereby insuring the seal between pressure port and actuator port.

In a second position, reference from the neutral position, the stem means is extended to move toward the spool means so as to provide smaller flow through the aperture in the spool means than commensurate with the flow through the bleed orifice in the spool means. The resulting unbalance of forces of the pressure-area relationship providing a greater force on the second end of spool means than on the first end, moves the spool means away from the stem means, and the poppet means therefore is moved away from the sealing engagement with the valve body, thus providing a fluid passage flow from the pressure port to the actuator port of the valve. Movement of the poppet means by the spool means insures sealing engagement of the second end of the poppet means with the first end of the spool means preventing direct fluid flow from the actuator port to the reservoir port.

From this brief description, it is seen that the spool means follows the stem means and that the actuator port is substantially sealed from the pressure port and reservoir port in the neutral position. The actuator port is sealed from the pressure port and communicates with the reservoir in the first position. The actuator port is sealed from the reservoir port and communicates with the pressure port in the second position.

In the preferred embodiment of one size of applicant's valve according to applicant's invention, the spacing of the stem means from the aperture in the second end of the spool means is on the order of 0.0003 inch to provide a flow commensurate with the flow through the bleed orifice in the spool means in the neutral position. A relationship change on the order of 0.0001 will therefore provide a great change in the pressure-area balance relationship.

The above embodiment and other advantages of applicant's improved servo-valve are more readily understood from the following detailed description, taken together with the accompanying drawings, wherein similar reference characters refer to similar elements throughout, and in which:

FIGURE 3 is a cross-sectional view of the control valve shown in FIGURE 2 in the first position;

FIGURE 4 is a cross-sectional view of the valve shown in FIGURE 2 in the second position;

FIGURE 5 is a sectional view of another embodiment of applicant's invention; and FIGURE 6 is a sectional view of another embodiment of applicant's invention.

Figure 1:
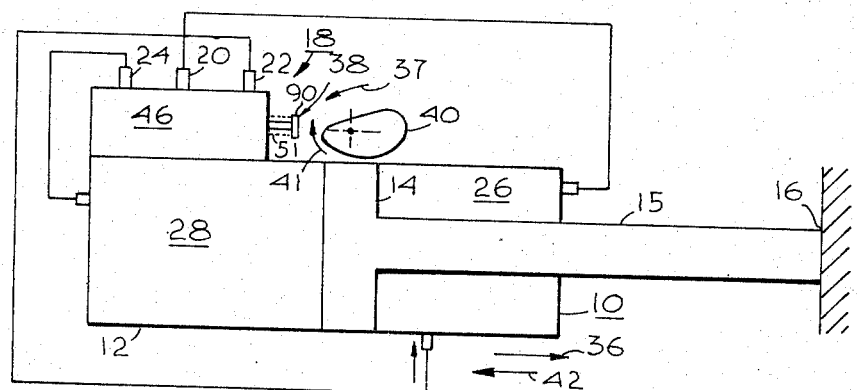
FIGURE 1 is a schematic representation of applicant's improved servo-control valve providing controlled operation of a fluid operated actuator system.

Applicant's invention herein is described as embodied in a hydraulic servo-controlled system to provide precise actuation of a piston type actuator. It will be appreciated, however, that such an embodiment is presented for illustrative purposes only and that applicant's invention is not to be limited by the precise details of construction shown in the drawings and described below.

Referring now to FIGURE 1, there is shown a schematic diagram of a servo-control system utilizing one embodiment of applicant's improved servo-control valve. As shown on FIGURE 1 there is an actuator 10 comprised of a cylinder 12 and a piston 14 having a piston rod 15. In the embodiment shown on FIGURE 1, the piston rod 15 is fixed at its end 16. Thus, the piston 14 remains stationary and the cylinder 12 moves reciprocatingly thereon. The cylinder 12 may, for example, be connected to any desired type of machine tool.

Mounted on the cylinder 12 there is a servo-control valve 18 according to one embodiment of applicant's invention. The valve 18 is provided with a pressure port 20, a reservoir port 22 and an actuator port 24. The pressure port 20 is connected to a first or pressure side 26 of the cylinder 12 and, as shown on FIGURE 1, the pressure side 26 is on the rod side of the piston 14. The actuator port 24 is connected to the second side or actuator side 28 of the cylinder and, as shown on FIGURE 1, the actuator side 28 is on the head side of the piston 14. The reservoir port 22 is connected to a sump or reservoir 30 that provides a supply of, for example, hydraulic oil 32 for actuation of the cylinder 12 on the piston 14 as controlled by the valve 18. It will be appreciated, of course, that utilization of hydraulic oil as the actuating fluid is a matter of design choice.

The hydraulic oil 32 is supplied, under pressure provided by pump means 34, to the pressure side 26 of the cylinder 12.

Automatic operation of the cylinder 12 is controlled by the valve 18. Thus, for example, if the cylinder 12 is moving towards the piston 14 in the direction indicated by the arrow 36 the stem means 38 of the valve 18 is in the first position, as described below in detail and remains in the first position until the stem means 38 of the valve 18 engages the cam 40. As the stem means 38 engages the cam 40 the stem means 38 is moved into the valve 18. As described below in detail, this causes the valve to move into the neutral position thereby stopping motion of the cylinder 12, and valve 18 remains in the neutral position until the stem means 38 is either allowed to extend from valve 18 by removal of cam 40 in the direction of arrow 37 or depressed into valve 18 into the second position by advancement of cam 40 in the direction of arrow 41. The latter condition being described in greater detail below. Therefore, movement of the cylinder 12 is controlled by the valve 18.

Before proceeding to the detailed description of the applicant's unique servo-control valve, it should be pointed out that in each position cited, the components within the valve body are in complete hydrostatic balance regardless of the forces counteracted by the system and regardless of the hydraulic pressures imposed on the valve and its components.

THE NEUTRAL POSITION

Figure 2:
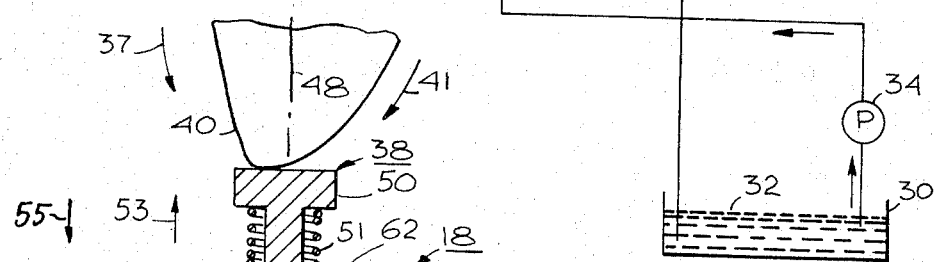
FIGURE 2 is a cross section of an improved servo-control valve according to applicant's invention herein in the neutral position.

FIGURE 2 is a cross-section of the valve 18, according to one embodiment of applicant's invention, for the valve in the neutral position. As shown in FIGURE 2 the valve 18 has a valve body 46 that is provided with the reservoir port 22, the pressure port 20 and the actuator port 24. In the preferred embodiment of applicant's invention, there is provided a sleeve means 98 that is fixedly coupled in the valve body 46 and does not move therein during normal operation of the valve means 18. Thus, for example, for convenience in manufacturing, the valve body 46 may be accurately drilled to provide the walls 100 to close tolerance. The sleeve means 98 may be then accurately machined from a separate structure for a press fit into the valve body 46 on the wall 100. As such, the particular function provided by the sleeve means 98 may be achieved with comparatively high accuracy. For all intents and purposes, however, the sleeve means 98 may be considered as a part of the valve body 46 structure itself. It will be appreciated, however, that many alternative structures may be achieved to provide the equivalent function of the sleeve means 98 in the valve body 46. For convenience of description in this patent application, however, it will be considered that the sleeve means 98 is part of the valve body 46.

A poppet means 96 is slidingly mounted in the valve body 46 for reciprocal motion therein along the longitudinal axis 48 thereof. The poppet means 96 is substantially cylindrical and has peripheral edge portions 108 that slidingly engage interior wall portions 110 of the sleeve means 98. The peripheral edge portions 108 of the poppet means 96 are provided with seal means 112 which, in the preferred embodiment of applicant's invention, may be in the form of labyrinth seals. As noted above, the reciprocal motion of the poppet means 96 in the sleeve means 98 may be considered as identically equivalent to reciprocal motion of the poppet means 96 in the valve body 46 since the sleeve means 98 does not move during operation of the valve 18.

The poppet means 96 has peripheral walls 122 defining a volume 124 that communicates with the pressure port 20 in the valve body 46 through an aperture 126 in the sleeve means 98.

The poppet means 96 is also provided with tapered peripheral edge portions 128 that under certain operational conditions of the valve 18 provide a cone seal with the sleeve means 98 to seal the chamber 124 and thereby seal the pressure port 20.

The poppet means 96 has wall portions 114 defining a passageway 116 therein extending from a first end 118 of the poppet means 96 to a second end 94 of the poppet means 96. The passageway 116 communicates at all times and in all positions during operation of valve 18 with the actuator port 24.

A spool means 74 is slidingly mounted in the valve body 46 for reciprocal motion therein in a path colinear with the poppet means 96. The spool means 74 is substantially cylindrical and is coaxially mounted with respect to the poppet means 96.

A first end 80 of the spool means 74 has conical walls 78 that, in the neutral position, are adapted to sealingly engage the second end 94 of the poppet means 96. As shown in FIGURE 2, in the neutral position, the second end 94 of poppet means 96 defines a first chamber 92 with a portion of the walls 78 of the first end 80 of spool means 74. Wall 86 and other portions of conical wall 78 of the first end 80 of the spool means 74 are in communication with the reservoir port 22 in the valve body 46.

The spool means 74 also has a substantially planar second end 76 which defines a second chamber 75 with walls 100 of valve body 46.

Walls 82 of spool means 74 define an aperture 84 in the spool means 74. The aperture 84 has a first portion 84' that extends through the wall 86 of spool means 74 and provides communication with the reservoir port 22. The first portion 84' communicates with a second portion 84'' that, in turn, communicates with a portion 84''' which extends through the second end 76 of spool means 74 to provide communication with second chamber 75.

Spool means 74 also has a wall 88 that defines a bleed orifice 90 that provides communication between chamber 92 and the chamber 75. The bleed orifice 90 in the spool means 76 does not communicate in the spool means 74 with the aperture 84 but is drilled off-center to provide continuous communication between the chamber 92 and the chamber 75 during all operational positions of the valve 18.

As shown in FIGURE 2, the spool means 74 has peripheral edge portions 104 provided with seal means 106 that slidingly engage the walls 100 in the valve body 46. In the preferred embodiment of applicant's invention the seal means 106 are in the form of labyrinth seals.

A stem means 38 is slidingly mounted in the valve body 46 for reciprocal motion therein along the longitudinal axis 48 thereof. The stem means 38 has an actuator end 50 that, in utilization of the valve 18, engages a cam means 40, as shown in FIGURE 1, or any other desired form of control for moving the stem means 38 relative to the valve body 46.

A body member 56 of the stem means 38 is also provided, in the preferred embodiment of applicant's invention, with seal means 72 on the peripheral edge portion 62 thereof and, for example, the seal means 72 may take the form of labyrinth type seals as shown on FIGURE 2.

The stem means 38 is also provided with a seal end 52 and the seal end 52 has a conical surface 54 that cooperates with the edge of walls 82 of aperture 84 in second end 76 of spool means 74 to form a spaced relationship therewith during certain operational conditions of the valve 18.

It is understood that the placement of the stem means 38 with its axis on the axis 48 of the valve body 46 is not a requirement for successful performance of this invention. All that is required is that the stem means 38 be able to be in a spaced relationship with the aperture 84 in spool means 74, wherever it may be located, during certain operational conditions. It should be further understood that all sealing surfaces in valve 18 indicated as conical are presented as one example of applicant's invention, as is the general cylindrical nature of the component parts of valve 18.

The stem means 38 is also vented internally so as to provide internal leakage rather than any external leakage. That is, any leakage along peripheral edge portions 62 is allowed to bleed into the interface between the valve body 46 and the peripheral edge portions 62 of the cylindrical body member 56 that engage the valve body 46 past labyrinth seals 72. This is achieved by providing first walls 64 defining a first aperture 66 in the stem means 38. The first aperture 66 extends from the end 60 of the seal end 52 a preselected distance into the body member 56. Second walls 68 define a second aperture 70 that provide a fluid flow path between the first aperture 64 and the peripheral wall portion 62 of the stem means 38. Thus, any leakage flow that may occur is internal and flows through aperture 84 and into reservoir port 22. Any external leakage from valve 18 is therefore eliminated.

As indicated above, all component parts of valve 18 are in substantial hydrostatic balance under virtually every operating condition of the hydraulic pressure within the body 46. Therefore, the cross-sectional area of body member 56 of stem means 38 is substantially the same area as the area of aperture 84 projected on the seal end 52 of stem means 38 and both are exposed to atmospheric pressure.

Conical walls 128 of poppet means 96 seal against the edge 99 of sleeve means 98 during certain operational conditions of the valve 18. The projected area of the aperture formed by wall 110 of sleeve means 98 on the first end 118 of poppet means 96 and the area of the second end 94 of poppet means 96 are substantially equal and in the neutral position are exposed to actuator pressure from actuator port 24. Further, the area of the walls 128 of the poppet means 96 exposed to system pressure from pressure port 20 in the volume 124 is substantially identical to the area of the wall 131 of the poppet means 96 exposed to the same system pressure from the pressure port 20 to the volume 124. Therefore, in the neutral position, the poppet means 96 is substantially in hydraulic balance.

In the neutral position, as shown in FIG. 2, the first end 80 of the spool means 74 is acted upon by two separate pressures. The first pressure, which is atmospheric or reservoir pressure is by communication of the reservoir through reservoir port 22 in valve body 46 and acts over a substantially annular area that is defined by the point of engagement at the second end 94 of poppet means 96 with this spool means 74 and the wall 100 of valve body 46. The second pressure acting on the first end 80 of spool means 74 is actuator pressure by communication of actuator port 24 through passageway 116 to chamber 92 and acts over a substantially circular area defined by the point of engagement of the second end 94 of poppet means 96 with spool means 74.

Also, as shown in FIG. 2, the second end 76 of spool means 74 is acted upon by two separate pressures. The first pressure is atmospheric by communication of the reservoir through reservoir port 22 through aperture 84 acting on spool means 74 over an area equivalent to the area defined by the aperture 84 in the second end 76 of the spool means 74. The second pressure to which the second end 76 of the spool means 74 is exposed is from chamber 75 and is one which, acting over the annular area defined by the wall 100 of the valve body 46 and the aperture 84 of the spool means 74, together with the reservoir pressure provides a force that exactly counterbalances the forces on the first end 80 of the spool means 74. This balance is automatically determined by the relationship of the conical surfaces 54 of the seal end 52 of the stem means 38 and the aperture 84 of the spool means 74. This determination of the relationship of the conical surfaces 54 and the aperture 84 is based on the flow from chamber 92 to the chamber 75 through bleed orifice 90 in the spool means 74.

Therefore, in the neutral position of valve operation, the spool means 74 is static by virtue of the substantially exact counterbalance of forces acting on the first end 80 with the forces acting on the second end 76 of the spool means 74. Further, in the neutral position, the second end 94 of poppet means 96 is in sealing engagement with the first end 80 of spool means 74 thus preventing direct actuator pressure flow from actuator port 24 to reservoir port 22, the only such flow being that through bleed orifice 90, chamber 75 and aperture 84. Also, in the neutral position, the conical walls 128 of the first end 118 of the poppet means 96 are in such relationship with sleeve means 98 as to permit only flow from volume 124, and therefore from pressure port 20, into the area communicating with the actuator port 24, as to just supply the volume of fluid passing through the bleed orifice 90. As noted above, in the neutral position, the conical surfaces 54 of seal end 52 of stem means 38 is only slightly spaced from the walls defining the aperture 84 in second end 76 of spool means 74. This spacing is just enough to let the small bleed flow equivalent to the flow through bleed orifice 90, into the chamber 75 which, of course, is full of fluid during operation of the valve 18. Therefore, the spacing of the conical walls 128 of poppet means 96 from the edge 99 of sleeve 98 is much smaller since, in the preferred embodiment of applicant's invention, the diameter of the edge 99 is very much greater than the diameter of the aperture 84 in second end 76 of spool means 74. In this neutral position, as shown in FIG. 2, there is neither flow into or out of actuator port 24 in valve body 46, the bleed orifice flow being made up by flow from pressure port 20, which, in turn, is made up from reservoir 30 by pump 34.

THE FIRST POSITION

As shown in FIG. 2, when the cam 40 is rotated in the direction of arrow 37 against the actuator end 50 of valve stem means 38, stem means 38 is moved in the valve 18 by spring means 51 in the direction of arrow 53. This permits the valve 18 to achieve a first position. FIG. 3 illustrates this first position of valve 18.

As shown in FIG. 3, the valve 18 is in the first position, the components having been moved thereto because of movement of the stem means 38 in the valve body 46 away from the spool means 74 under the influence of spring means 51. This results in a withdrawal of the seal end 52 from the second end 76 and the aperture 84 in spool means 74. This reduces the fluid pressure in chamber 75 acting on second end 76 of spool means 74 by permitting greater flow through aperture 84 than could be supplied through bleed orifice 90 in spool means 74. By the action of this reduction in the force on second end 76, a greater force is now exerted on the first end 80 of spool means 74, the spool means 74 moves in the direction of arrow 53 as illustrated in FIG. 3. This movement of spool means 74 tends to continue until a balanced relationship with the seal end 52 of the stem means 38 is achieved. As decribed above, this balanced relationship is such that it provides flow commensurate with the flow through bleed orifice 90 from chamber 92.

The poppet means 96 is restricted in its motion in the direction of arrow 53 by the abutment of the conical wall 128 of the poppet means 96 with the edge 99 of sleeve 98. Since the displacement of the spool means 74 is such that a separation exists between the first end 80 of spool means 74 and the second end 94 of poppet means 96, a flow is established from chamber 92, the area directly adjacent to the second end 94 of poppet means 96 to the reservoir port 22. This flow results in a pressure drop along passageway 116 of poppet means 96, which pressure drop in turn results in a greater force on the first end 118 than on the second end 94 of poppet means 96. The volume 124, and consequently the pressure port 20 is sealed from the actuator port 24.

As shown in FIG. 3, in the first position of valve operation the spool means 74 again is static by virtue of the exact counterbalance of forces acting on the first end 80 and the second end 76 of the spool means 74 and the spool means 74 is in the same relationship with stem means 38 as in the neutral position. The second end 94 of poppet means 96 in the first position is not in sealing engagement with the first end 80 of the spool means 74, thus permitting direct flow from actuator port 24 to reservoir port 22, since the volume 92 is now open to reservoir port 22. The resulting pressure differential across passageway 116 causes the poppet means 96 to move into sealing engagement with sleeve means 98 to prevent flow from the volume 124, and therefore from the pressure port 20, to the actuator port 24 in the first position. In this first position, as shown in FIG. 3, direct flow is permitted from the actuator port 24 to the reservoir port 22, but no flow occurs into or out of pressure port 20.

It should be noted that in the first position shown in FIG. 3, there is not any one fixed relationship of one means to another, other than as described above, but rather the first position is a mode of operation so that the flow from actuator port 24 to the reservoir port 22 may be great or small depending on the degree of sealed relationship between the first end 80 of spool means 74 and the second end 94 of poppet means 96 as determined by the relative position of stem means 38 in the valve body 46.

THE SECOND POSITION

As shown in FIG. 1, when the cam 40 is rotated in a direction of arrow 41 against the actuator end 50 of stem means 38, the stem means 38 is moved in the direction of arrow 55 into the valve 18, against the force of spring means 51 into a second position. FIG. 4 illustrates this second position of valve 18.

Referring now to FIG. 4, the valve 18 is shown in the second position having been moved thereto from the neutral position shown in FIG. 2, or the first position shown in FIG. 3, by movement of the stem means 38 into the valve body 46. This movement also resulted in a tendency to decrease the spacing between the seal end 52 of the stem means 38 and the walls defining the aperture 84 in the second end 76 of spool means 74 thereby increasing the pressure in chamber 75 acting on second end 76 of spool means 74. This increased pressure in chamber 75, resulting from closing the aperture 84 to a point where it could not accommodate the flow supplied to chamber 75 by the bleed orifice 90 in spool means 74, increases the pressure on the second end 76 of spool means 74. By action of a greater force being exerted on the second end 76 than be exerted on the first end 80 of spool means 74, by reason of the larger area exposed to chamber 75 than the area exposed to chamber 92, the spool means 74 moves away from the seal end 52 of stem means 38 in the direction of arrow 55 ultimately to the position shown in FIG. 4 where the relationship of the seal end 52 of the stem means 38 and the aperture 84 of the spool means 74 is once again commensurate with the flow through bleed orifice 90 of spool means 74 and the spool means 74 is in hydrostatic balance as in the neutral and first position. Poppet means 96 is unrestricted in its motion in the direction of arrow 55 and is moved to the position shown in FIG. 4 by the engagement of the second end 94 thereof with the first end 80 of spool means 74. Movement of poppet means 96 cannot exceed that excursion predicated by the movement of spool means 74 because to do so would break the sealed engagement of second end 94 of poppet means 96 and first end 80 of spool means 74 thereby permitting flow from chamber 92 and a pressure drop along passageway 116 of poppet means 96. Such a pressure drop, if it were to occur, would urge the poppet means back into contact with spool means 74.

It will be appreciated that in normal operation the conical surface 52 of the stem means 38 never actually engages the spool means 74. Rather, as the stem means 38 moves in the direction of arrow 55 towards the spool means 74, when the flow through aperture 84 decreases to less than that supplied by bleed orifice 90 to first chamber 75, the spool means 84 moves away from the stem means 38. This is a continuous movement as long as the stem means 38 is moved downward in the direction of arrow 55, the second direction into the valve body 46. It will be appreciated, of course, that once the poppet means 96 is bottomed on the base 102 and spool means 74 is seated on the second end 94 of poppet means 96, then further movement in the direction of arrow 55 of either spool means 74 or poppet means 96 is impossible and, if the stem means 38 were, by a large force, to be forced into further movement in the direction of arrow 55, it perhaps would engage the spool means 74. However, such engagement is abnormal operation of the valve 18 and the design of cam 40, for example, is such that this will not occur since the response time of the cylinder 10 and/or piston 14 is fast enough to prevent overloading the stem. Such an occurrence, obviously, would be a misuse of valve 18 and would indicate a malfunction either in design or operation.

Thus, the spool means 74 always seeks to establish a hydrostatic position wherein it is spaced from the seal end or portion 52 of stem means 38 just enough to provide flow through the aperture 84 that is commensurate with flow into chamber 75 from the bleed orifice 90. Transient conditions involved in movement from the neutral position, the first position or the second position into any of the other positions are those movements necessary so that the spool means may find this particular relationship.

In the second position of valve operation, as illustrated on FIG. 4, the stem means 38 has moved into the valve body 46 and consequently the spool means 74 has moved away from the seal end 52 of the stem means 38 in the second direction indicated by the arrow 55. In so moving, spool means 74 has sealingly engaged second end 94 of poppet means 96 to seal chamber 92 and has moved poppet means 96 so that there is no sealing engagement between the tapered walls 128 and the edge 99 of sleeve means 98. It will be appreciated that FIG. 4 shows the condition of the second position wherein the poppet 96 has actually bottomed against the base 102. Other conditions will also apply as a second position wherein the poppet means 96 has not yet bottomed against base 102, but rather is still spaced a certain distance therefrom. The criterion of the second position, of course, is the movement of the poppet means 96 to provide a greater separation between the walls 128 and the edge 99 of sleeve 98 than occurs to provide bleed orifice flow. This separation allows a second comparatively large flow from the volume 124, and consequently from the pressure port 20, into the actuator port 24. Such flow, of course, continues until there is further movement of the valve stem 38, in normal operation of the valve 18. Thus the cam 40 may be contoured to provide time limitations necessary on the second position, as well as on the first or neutral position.

OPERATION

Having thus described the three basic positions of operation of valve 18 and the mode of transition of the internal parts between these three positions, applicant will now describe the operation of valve 18 as it affects the movement of and control of the cylinder 12 and piston 14 shown in FIG. 1. It will be appreciated that the cylinder 12 may be connected to any type of desired machine tool or other operative mechanism (not shown on FIG. 1) as may be desired.

As indicated above, when the valve 18 is in the position indicated on FIG. 1, the spring 51 has biased or extended the stem 38 from the valve body 46 and the valve is thus biased into the position indicated on FIG. 3, or as described above, in the first position. As such, there is the first comparatively large direct flow from the actuator port 24 in the valve 18 to the reservoir port 22. It will be appreciated, as can be seen from FIG. 1, that as the flow in the valve 18 occurs from actuator port 24 to the reservoir port 22, fluid flows from the reservoir port 22 to the reservoir 30. Such flow decreases the pressure in the actuator end 28 of the cylinder 12 and therefore there is an unbalance across the piston 14. Since the pressure in the piston or pressure volume 26 of the cylinder 12 is constantly made up by the pump 34, the entire cylinder 12 upon which the valve 18 is attached, moves in the direction indicated by the arrow 36 until the actuator end 50 of the stem 38 engages the cam 40. When the actuator end 50 of the stem 38 engages the cam 40, movement of the cylinder 12 will be controlled by the rotation of the cam 40. If the movement of the cam 40 is a rotation in the direction of the arrow 37, control movement of the cylinder 12 is obtained, since the spring 51 constantly pushes the actuator end 50 against the cam 40 and rotation in the direction of the arrow 37 of cam 40 shows, at first, a smaller radius from the center of rotation thereof. When this point is passed, since the spring 51 constantly biases the stem 38 into the first position, as the distance from the center of rotation to the periphery of the came 40 that is in engagement with the actuator end 50 of the stem 38 increases, the stem 38 moves inwardly into the valve 38. At some point in this inward movement, the valve 38 at least passes through the neutral position shown in FIG. 2. In the neutral position, since there is no flow into or out of the pressure port 20, except for the small bleed flow make-up nor into nor out of the actuator port 24, there is no movement of the cylinder 12. However, as rotation of the cam 40 further continues in the direction of the arrow 37, or if it initially is in the direction of the arrow 41, the stem means 38 moves into the second position, as shown on FIG. 4.

In the second position, there is the second comparatively large flow directly from the pressure port 20 into the actuator port 24 in the valve 18. Thus the volume 28 of the cylinder 12 is filled with fluid supplied from the pressure side 26 thereof at the value of the pump pressure 34 which, in this embodiment of applicant's invention, may be considered the pressure port pressure. As the pressure in the volume 28 increases so that the force on the cylinder 12 is greater in the direction indicated by the arrow 42 than in the direction indicated by the arrow 36, the cylinder 12 will commence movement in the direction indicated by the arrow 42. During such movement, of course, it will be appreciated, the actuator end 50 is biased against the cam 40 by the spring 51. Therefore, as the rotation of the cam 40 continues, the valve 18 will be kept in the second position until the radius to the center of rotation from the periphery of the cam 40 decreases to a value sufficient to let the stem 38 tend to move from the valve 18 under the influence of spring 51. The valve then passes through the neutral position again, where motion stops and will again be moved into the first position where movement of the cylinder 12 occurs in the direction of the arrow 36 as indicated above.

From this description of the operation of applicant's improved valve 18, it can be seen that control of the stem 38 with relation to the valve body 46 controls gross movements of the cylinder 12 on the piston 14, regardless of the forces associated with such movement in the cylinder 12.

As noted above, the valve 18 is biased, by spring 51 to maintain the first position. Depending upon the application, of course, it may be desirable to have the hydraulic servo-control valve according to applicant's invention biased into the second position, rather than the first position. One such embodiment for showing such a biasing is illustrated on FIG. 5.

As shown on FIG. 5, there is a valve 140 that, in many respects, is similar to the valve 18 shown on FIGS. 1 through 4, above. The valve 140 has a valve body 142 having an actuator port 144, a pressure port 146 and a reservoir port 148. The valve body 142 is closed on a bottom end with a base means 150 that sealingly engages the valve body 142. In the valve body 142, there is an internal cavity defined by internal walls 152. A sleeve means 154 is press-fit into the valve body 142 for engagement with the walls 152 and provides the same function therewith as the sleeve means 98 shown on FIG. 2. That is, the sleeve means 154 to all intents and purposes may be considered a part of the valve body 142 since the inclusion therein of the sleeve means 154 allows the walls 152 to be more accurately fabricated.

A poppet means 156, which may be similar to the poppet means 96 shown on FIG. 2, a spool means 158, which may be similar to the spool means 74 shown on FIG. 2, and a stem means 160 are slidingly mounted in the valve body 142 for reciprocal motion therein. In this embodiment of applicant's invention, as can be seen from FIG. 5, the stem means 160 extends completely through the spool means 158 and the poppet means 156 as through the base means 150, to provide an actuator end 162. Similarly, the stem means 160 also protrudes from the opposite end of the valve body 142 to provide an end 164. In this embodiment of applicant's invention, a spring means 166 is provided which biases the stem means 160 in the direction indicated by the arrow 168 and which, as described below, biases the valve 140 into the second position.

The stem means 160 may be provided with labyrinth seals, for example, in the region that it slidingly engages the spool means 158. Labyrinth seals, as shown in area 170, may also be provided where the stem means 160 protrudes through the base means 150, as indicated in area 172 and through the valve body 142, as indicated in area 174.

The valve 140, as shown in FIG. 5, is in the neutral position. As described above in connection with the embodiment of applicant's invention shown on FIGS. 1 through 4, in the neutral position there is bleed flow from the pressure port 146 through a passageway 176 in the poppet 156 to a second chamber 180 between the sealing engagement of a second end 182 of the poppet means 156 and the spool means 158. A bleed orifice 184 is provided in the spool means 158 to allow bleed flow from the second chamber 180 into the first chamber 186 above the spool means 158 and which bleed flow flows through an aperture 188 in the spool means 158 to the reservoir port 148.

Thus, the three positions, that is the neutral, first and second positions of this embodiment of applicant's invention, are substantially identical in operative effect as the three positions described above in connection with the embodiment of applicant's invention shown in FIGS. 1 through 4. That is, when a cam 190 is rotated against the actuator end 162 of stem 160, the spring means 166 constantly biases the actuator end 162 against the cam means 190. Thus as the cam means 190 rotates in the direction indicated by the arrow 192, the stem means 162 tends to follow the cam means and thus protrude closer to the center of rotation 194 of cam means 190 maintaining the valve in the second position and causing movement in the direction indicated by the arrow 168. In the second position, of course, as described above, there is flow between the pressure port 146 and the actuator port 144 and operation occurs virtually identically to that shown and described above for the embodiment illustrated on FIG. 4. That is, the poppet 156 is unseated from the sealing engagement with the sleeve means 154 to allow the free flow of fluid from the pressure port 146 through the volume 196 to the actuator port 144.

Rotation of the cam means 190 in the direction indicated by the arrow 198, of course, moves the stem means 160 in the direction indicated by the arrow 200. As such, movement of the stem means 160 in the direction indicated by the arrow 200 relative to the valve body 142, moves the stem away from the preselected spaced relationship with the aperture 188 in the spool 158 and for such movement the spool 158 is moved upwardly in the direction of the arrow 200 to establish once again the spaced relationship for hydraulic balance so that only bleed flow occurs through the aperture 188. As such, as described above in connection with the description of FIG. 3, the valve 140 moves into the first position.

In the first position, of course, there is flow of fluid from the actuator port 144 directly to the reservoir port 148 through the passageway 176 in poppet means 156 and to the second chamber 180. Similarly, in the first position, the poppet means 156 is in sealing engagement with the sleeve means 154, and the sealing engagement between the spool means 158 and the poppet means 156 is broken to allow this direct flow of fluid from the actuator port 144 through the passage 176 to the volume 180 and thence to the reservoir port 148. Such a condition, as described above, allows movement of the spool means 198 in the direction indicated by the arrow 200 as the spool means 158 attempts to find the hydrostatic balance condition.

Thus, the embodiment shown on FIG. 5 allows a biasing of the stem means 160 into the second position so that the valve may be biased to allow movement in the opposite direction to that shown for the embodiment illustrated in FIGS. 1 through 4. It will be appreciated that the end 164 of the stem means 160 could also, easily, be made an actuator end by providing a spring biasing the stem 160 in the direction indicated by the arrow 200 to provide operation identical with that described above in connection with the operation of valve 18. Thus, the valve 140 may be biased in either the first position or the second position as may be desired. The valve 18 could, of course, also be biased in either the first or second positions, if desired.

In the valve 140 there is provided external leakage ports 202 and 204. As opposed to the embodiment of the valve shown in FIGS. 1 through 4 wherein internal leakage to the reservoir port was provided, in this embodiment of applicant's invention external leakage ports are provided to drain away any leakage that might occur past the area 172 or the area 174. It will be appreciated that similar external leakage ports could be provided in the embodiment of applicant's invention shown in FIGS. 1 through 4, if desired, or internal leakage provisions could be made in the embodiment shown in FIG. 5 similar to that shown for valve 18. Thus, the method of leakage control whether it be internal or external, may be used in any of the embodiments of applicant's invention described herein.

Applicant's invention of an improved hydraulic servo-control valve is not limited to providing the directional motion of the valve in response to movement of the stem therein, as shown for the embodiment described above. Rather, applicant's valve may also be utilized to provide motion of the valve in a direction opposite to the direction of motion of the stem or, in other applications, wherein the reservoir, pressure and actuator ports may be different than shown on FIG. 1. FIG. 6 illustrates one such embodiment of applicant's invention.

As shown on FIG. 6, there is a valve 220 according to this embodiment of applicant's invention, that is provided with a valve body 222. The valve body 222 has an actuator port 224, a reservoir port 226, and a pressure port 228. As discussed below in detail, it can be seen from FIG. 6 that the relative positions of the reservoir port 226 and the pressure port 228 have been interchanged with regard to the interconnecting passages internal the valve 220. The valve 220 is also provided with a base means 230 that sealingly engages the valve body 222.

A stem means 232, a spool means 234, and a poppet means 236 are mounted in the valve body 222 for reciprocal motion therein. In this embodiment of applicant's invention, the stem means 232 protrudes through the spool means 234 and poppet means 236 and emerges from the valve body 222 and provides a first end 238 external the valve body 222 at a first end, and a second end 240 external the base 230. Labryinth seals are only provided in the areas 242 where the stem means 232 engages the base means 230 and the area 244 where the stem means 232 engages the valve body 222. The valve body 222 also has internal walls 246 defining an internal cavity in which the spool means 234 slidingly moves. A sleeve means 248 which may be similar to the sleeve means 98 and 154 described above, is press-fit into the cavity defined by the walls 246 for substantially permanent engagement therewith. Thus, the sleeve means 248, to all intents and purposes, may be considered as part of the valve body 222, since it does not move during operation of this embodiment of applicant's invention, and is merely provided to allow more accurate manufacturing of the valve 220.

As shown on FIG. 6, the valve 220 is in the neutral position, and in this position there is a flow from the pressure port 228 to a first portion 259 of the second end 265 of the spool means 234 through a bleed orifice 250 in the spool means 234 into a volume 252. The stem means 232 has a sealing portion 254 with conical walls 256 that, in the neutral position, are spaced a predetermined distance from wall portions 258 defining an aperture 260 in the spool 234. Spacing is similar to that described above for the neutral positions of the valve 140 and the valve 18. However, in this embodiment of applicant's invention shown on FIG. 6, the aperture 260 communicates with a second chamber 262 in a second portion 263 of the second end 265 of the spool means 234 between the poppet means 236 and the spool means 234. In the neutral position, the poppet means 236 sealingly engages the spool means 234 to define the second chamber 262 and an aperture 264 in the poppet means 236 provides communication between the second chamber 262 and the actuator port 224. Thus, in this embodiment of applicant's invention, bleed flow from the pressure port 228 flows into the reservoir port 226 and the poppet means 236 is slightly unseated from sealing engagement with the sleeve means 248 to allow this bleed flow from the pressure port 228 to flow into the reservoir port 226. It will be appreciated that the unseating of the poppet means 236 from the sleeve means 248 in the neutral position together with the positioning of the conical walls 256 with the walls 258 defining the aperture 260 in the spool 234, is similar to that described above for the valve 18 and the valve 140. In the valve 140, however, in the neutral position, as shown on FIG. 5, the poppet means 156 is slightly unseated from sealing engagement with the sleeve means 154 commensurate with the bleed flow through the bleed orifice 184 and into the aperture 188 to provide this bleed flow rate. Thus, in all the embodiments of applicant's invention described herein, in the neutral position there is a small bleed flow from the pressure port to the reservoir port through the flow paths in the particular embodiments of applicant's invention illustrated herein may be different.

When a spring 266 is provided to bear against the second end 240 of the stem means 232 to bias the stem means 232 in the direction indicated by the arrow 268, the tapered or conical walls 256 move closer to the walls 258 defining the aperture 260 in spool means 234 and decrease the flow area available to a value less than that necessary to pass the flow that occurs through the bleed orifice 250. As such, the pressure in first chamber 252 increases, tending to move the spool means 234 in the direction indicated by the arrow 268. As this downward movement continues, it being remembered that the stem means 232 never actually engages the walls 258 during normal operation of the valve 220, the poppet 236 is moved downward because of the sealing engagement of the poppet 236 with the spool means 234, and this unseats the poppet 236 from any sealing engagement or from the relationship that the poppet means 236 has in the neutral position with the sleeve means 248. In any event, the poppet means 236 is in a non-sealing engagement relationship with the sleeve means 248 when the stem means 232 and spool means 234 move in a direction indicated by the arrow 268. This movement provides a direct flow path from the actuator port 224 through the volume 270 in peripheral wall portions 271 of poppet means 248 and to the reservoir port 226. Thus, this position of the valve, which may be considered the second position of the valve, provides direct communication, as noted above, between the actuator port 224 and the reservoir port 226.

In the valve 140 illustrated on FIG. 5, and the valve 18 illustrated on FIGS. 2 through 4, in the second position there is provided direct communication between the actuator port and the pressure ports. Thus, for example, if the valve 220 were utilized in the arrangement illustrated schematically on FIG. 1, movement of the valve 220 into the second position would provide movement of the valve and cylinder 12 in the direction indicated by the arrow 272 or opposite to the direction of movement obtained with either the valve 18 or the valve 140 when utilized in the same environment. It will be noted that this direction of the arrow 272 is opposite to the direction of the arrow 268 and thus, in this embodiment of applicant's invention shown on FIG. 6, movement of the stem in one direction provides movement of the valve and consequently, the mechanism controlled by the valve in an opposite direction, rather than in the same direction that is provided in the valve 18 and the valve 140.

If the stem 232 of the valve 220, shown on FIG. 6, is moved in the direction indicated by the arrow 272, the spool 234 will move in the direction indicated by the arrow 272 in an attempt to re-establish hydraulic equilibrium therewith that is achieved when the spacing between the conical walls 256 of the stem means 232 and the walls 258 defining the aperture 260 in the spool means 234 provides a flow area providing a flow equivalent to the flow through the bleed orifice 250. The poppet means 236 moves in the direction indicated by the arrow 272 to a sealing engagement with the sleeve 248 but, in the event that the stem 232 has been moved beyond the neutral position, the spool means 234 will move away from the poppet 236 thus opening up a direct communication from the second chamber 262, and consequently the actuator port 224 through passageway 264 to the pressure port 228 and flow from the pressure port 228 to the actuator port 224 occurs. In this position of the valve just described, which may be considered the first position of the valve, there is direct communication of the pressure port 228 with the actuator port 224, whereas in the valve 18 and the valve 140 described above, in the first position there was direct communication between the actuator port and the reservoir port. Thus, in the first position of the valve 220, if it were to be used in the environment shown schematically on FIG. 1, the stem 232 has been moved in the direction indicated by the arrow 272 to the first position, but the valve 220 together with the structure to which it may be attached such as the cylinder 12, moves in the direction indicated by the arrow 268 which is opposite to the direction of movement of the stem 232 into the first position.

It will be appreciated that in this embodiment of applicant's invention shown on FIG. 6, the valve 220 may also be provided with a spring to bias the stem means 232 into the first position indicated by the arrow 272, if desired. This would be merely a design choice by those skilled in the art, depending upon the particular application to which the valve 220 may be applied. Applicant's invention herein, of course, is directed to the hydraulic servo-control valve and not to the various connections that may be made between applicant's improved hydraulic servo-control valve and the unit that is controlled thereby.

In order to achieve proper positioning of the various components of applicant's improved hydraulic servo-control valve according to his invention herein, in some applications of applicant's invention, applicant has found it desirable to provide a small biasing of the poppet means in the direction of sealing engagement with the sleeve means. Thus, in the valve 18 and the valve 140, described above, the sleeve may be constructed so that its diameter at the point where it seals with the poppet, and consequently the outside diameter of the poppet at this point is slightly smaller than the outside diameter of the poppet where the poppet means seals at the spool. This provides a slight unbalancing to provide a bias of the poppet in the direction of sealing engagement with the sleeve means. In the valve 220 shown on FIG. 6, similar biasing of the poppet in the direction of sealing engagement with the sleeve means may also be achieved. In this embodiment of applicant's invention, the diameter of the sleeve means 248 and consequently the outside diameter of the poppet means 246 at this point may be made slightly larger than the outside diameter of the poppet means 236 at the point where it engages the sleeve means 248 for sealing engagement therewith. The small difference between these two areas may be utilized to provide a slight biasing force for sealing engagement of the poppet 236 with the sleeve 248.

Further, it can be seen from the above description of the various embodiments of applicant's invention, that movement of the three moving parts, that is, the stem means, the spool means and the poppet means, controls the flow between the various ports in the valve body. In the embodiment of applicant's invention shown in FIGS. 1 through 4 and in FIG. 5, movement of the stem in what has been termed the first direction, allows the comparatively large flow rate between the actuator port and the reservoir port. This flow is large in comparison to the bleed orifice flow that occurs in the neutral, first and second positions between the pressure port and the reservoir port. Also, movement of the stem means in what has been termed the second position allows a comparatively large flow between the pressure port and the actuator port. Once again, this flow is large in comparison with the bleed orifice flow.

In the embodiment of applicant's invention shown on FIG. 6, movement of the stem means 232 into what has been termed the first position allows a comparatively large fluid flow rate between the pressure port and the actuator port, and movement of the stem means into what has been termed the second position allows a comparatively large fluid flow rate between the actuator port and the reservoir port. In the embodiment shown on FIG. 6, these flow rates are large in comparison to the bleed flow between the pressure port and the reservoir port that occurs in each of the positions of the valve. Thus, the embodiment shown on FIG. 6 provides the opposite flow paths for the positioning of the stem means than that shown in the other embodiments of applicant's invention. Thus, it will be appreciated, that the terminology "first position" and "second position" and the corresponding flow rates has been selected for convenience in description. The first position is the displacement from the neutral position in a first direction, and the second position is a displacement from the neutral position in a second direction that is opposite to the first direction. Selection of the nomenclature "first position" and "second position" has, of course, been done for convenience in description and is not intended to be a limitation upon the scope of applicant's invention or of the various embodiments herein.

The terminology "pressure port," "actuator port" and "reservoir port" as utilized herein indicates that the pressure port is connected to a source of fluid under pressure of, for example, the pump 34 of FIG. 1. The actuator port is connected to a source of fluid pressure less than the pressure of the pressure port, and the reservoir port is connected to fluid at essentially atmospheric or ambient pressure. Thus, fluid at the actuator port is at a pressure less than the pressure of fluid at the pressure port and fluid of the reservoir port is at a pressure less than the pressure of fluid at the actuator port.

This concludes the description of the various preferred embodiments of applicant's improved hydraulic servo-control valve. From the above, it can be seen that applicant has provided a compact hydraulic servo-control valve in which only three moving parts are provided. Comparatively small movements of one of these three moving parts which may be moved with comparatively small forces, may be utilized to control large forces encountered in the system controlled by the hydraulic servo-control valve according to applicant's invention herein. It will be appreciated that the various design features and operational characteristics of each of the embodiments and, of other embodiments, may equally well be interchanged and utilized in any embodiment of applicant's invention. That is, the various design features described and illustrated in the preferred embodiments of applicant's invention, are not limited to such embodiments, but may be equally well utilized in all embodiments of applicant's invention to the extent that they do not interfere with the design operational characteristics thereof.

Those skilled in the art may find many variations and adaptations of applicant's invention. Accordingly, the following claims are intended to cover all such variations and adaptions falling within the true scope and spirit thereof.

What is claimed is new and desired to be secured by Letters Patent of the United States is:

1. In a servo-control valve the improvement comprising, in combination:
   a valve body;
   a stem means mounted for reciprocal motion in said valve body and having a seal portion and an actuator end portion, and said stem means adapted to move reciprocally along a longitudinal axis thereof;
   a spool means mounted for reciprocal motion in said valve body adjacent said seal portion of said stem means and having an upper surface and a lower surface, and having first walls defining an aperture therein, and said seal portion of said stem means adapted to be separated from predetermined portions of said first walls in said upper surface of said spool means by a first preselected distance, said spool means adapted to move reciprocatingly in paths colinear with said stem means for maintaining said preselected distance, and said spool means having second walls on said lower surface thereof defining a chamber;
   a poppet means mounted for reciprocal motion in paths colinear with said spool means and having an upper surface and a lower surface, and said upper surface adapted to sealingly engage said second walls of said lower surface of said spool means in a neutral and a second position to seal said chamber, and to be separated therefrom in a first position, and said poppet means having first walls defining a passageway therein for fluid communication between said upper surface and said lower surface and said poppet having walls defining a peripheral volume thereon sealed from said passageway in said neutral position and said first position;
   and said spool means having walls defining a bleed orifice therein providing communication between said chamber and said upper surface of said spool means;
   a first port in said valve body communicating with said aperture in said spool means;
   a second port in said valve body communicating with said passageway in said poppet means and with said chamber;
   a third port in said valve body communicating with said peripheral volume of said poppet means;
   and said first port in communication with said second port in said first position through said passageway and said chamber, said third port in communication with said second port in said second position, and said first port in communication with said third port through said aperture and said bleed orifice in said spool means and said passageway in said poppet means.

2. Arrangement defined in claim 1 wherein said first port is a reservoir port, said second port is an actuator port and said third port is a pressure port.

3. Arrangement defined in claim 1 and further including a spring means for biasing said stem means in said first position.

4. An improved servo-control valve comprising, in combination:
   a valve body having a first port, a second port and a third port;
   stem means reciprocally movable in said valve body from a neutral position in a first direction and a second direction;
   a spool means slidingly mounted in said valve body adjacent said stem for reciprocal movement in paths colinear with said stem means and adapted to remain spaced a preselected distance from preselected portions of said stem means and to move toward said stem means to maintain said preselected distance for said stem means displaced from said neutral position in said first direction, and adapted to move away from said stem means to maintain said preselected distance for said stem means displaced from the neutral position in said second direction;
   poppet means slidingly mounted in said valve body adjacent said spool means for reciprocal motion in paths colinear with said stem means and said spool means, for movement in said second direction with said spool means;
   and said movements of said stem means, said spool means and said poppet means for selectively controlling communication between said ports in said valve body.

5. Arrangement defined in claim 4 wherein said first port is a pressure port, said second port is an actuator port and said third port is a reservoir port.

6. An improved servo-control valve of the type having a valve body with a supply pressure port, a reservoir port and an actuator port, and having a predetermined small fluid flow rate between said reservoir port and said pressure port in a neutral position, a first position and a second position, and a comparatively large fluid flow rate between said actuator port and said reservoir port for displacement from said neutral position into said first position, and a fluid flow rate between said pressure port and said actuator port for displacement from the neutral position in said second position, comprising, in combination:
   a stem means having a seal end internal said valve body and an actuator end external said valve body, and mounted in said valve body for reciprocal motion;
   a spool means mounted in said valve body and having a substantially planer first end adjacent said seal end of said stem means, and a second end opposite thereto defining a cavity, and said spool means having first walls defining an aperture providing a fluid flow path between said reservoir port and said first end of said spool means, and second walls defining a bleed orifice providing a fluid flow path for said small fluid flow rate between said first end of said spool means and said cavity in said second end of said spool means, and seal end of said stem means spaced a preselected distance from said first walls in said first end of said spool means for allowing said small fluid flow rate through said aperture and said stem means biased to move away from said spool means into said first position and said spool means adapted to move toward said seal end of said stem means in said first position, and said spool means adapted to move away from said seal end of said stem means for movement of said stem means into said second position, to maintain said preselected spacing from said seal end of said stem means;
   a poppet means mounted in said valve body for reciprocal motion in paths colinear with said stem means and said spool means, and having a first end for sealable engagement with said cavity in said second end of said spool means in the neutral position and the second position, and a second end opposite said first end, and said poppet means having first walls defining a fluid passageway providing a fluid flow path between said cavity in said second end of said spool means and said second end of said poppet means, said actuator port in communication with said second end of said poppet means and said poppet means having second walls in peripheral edge portions thereof defining a volume communicating with said pressure port, and said pressure port sealed from said actuator port and said fluid passageway in said poppet means in said first position, and said pressure port communicating with the actuator port in said second position.

7. An improved servo-control valve of the type having a valve body with a first port, a second port and a third port, for allowing a predetermined small fluid flow rate between said first port and said second port, and a first comparatively large fluid flow rate between said second port and said first port for displacement from a neutral position in a first direction, and a second comparatively large fluid flow rate between said first port and said third port for displacement from said neutral position in a second direction opposite said first direction, comprising, in combination:
- a stem means slidingly mounted in said valve body and having a seal portion therein and an actuator portion external said valve body;
- a spool means slidingly mounted in said valve body and a first end of said spool means adapted to remain spaced a first preselected distance from said seal portion of said stem means in said neutral position, and to follow said stem means to maintain said preselected distance for movement of said stem means in said first direction and in said second direction;
- a poppet means slidingly mounted in the valve body and sealingly engaging a second end of said spool means in said neutral position for movement of said stem means in one of said first and said second directions, and spaced therefrom for movement of said stem means in the other of said first and said second directions, to control said first and said second comparatively large fluid flow rates.

8. An improved servo-control valve of the type having a valve body with a first port, a second port and a third port, for allowing a predetermined small fluid flow rate between said second port and said first port in said neutral position, and a first comparatively large fluid flow rate between said third and said second ports for displacement from said neutral position in a first direction, and a second comparatively large fluid flow rate between said first port and said third port for displacement from said neutral position in a second direction opposite the first direction, comprising, in combination:
- a stem means having a seal portion internal said valve body and at least one actuator portion external said valve body, slidingly mounted in said valve body for reciprocal motion therein;
- a spool means slidingly mounted in said valve body for reciprocal motion in paths colinear with said stem means, and having first walls defining an aperture providing a first fluid flow path between a first end of said spool means adjacent said seal portion of said stem means and a first portion of a second end thereof spaced from said first end, and second walls defining a bleed orifice providing a second fluid flow path separate from said first fluid flow path between said first end and a second portion of said second end, and said stem means adapted to remain spaced a preselected distance from predetermined portions of said first walls of said spool means in said second end thereof to provide said small fluid flow rate;
- a poppet means slidingly mounted in said valve body for reciprocal motion in paths colinear with said stem means and adjacent said second end of said spool means and said poppet means having first walls defining a fluid passageway between a first end thereof adjacent said spool means and a second end thereof spaced from said first end and having second walls in peripheral edge portions defining a volume, and said poppet sealingly engaging predetermined portions of said second end of said spool means to seal said first portion from said second portion and to provide communication between said passageway in said poppet means and said first end of said spool means for said stem means in said neutral position and moved in one of said first and said second directions from said neutral position, and said poppet means spaced from said spool means for said stem means moved in the other of said first and said second directions;
- and said stem means yieldingly biased to moveably position said stem means in a position other than said neutral position.

9. The arrangement defined in claim 8 wherein said first port is a supply pressure port, said second port is a reservoir port, and said third port is an actuator port, and said reservoir port is in communication with said first portion of said second end of said spool means, said predetermined portion of said second end of said spool means seals said first portion from said second portion of said second end of said spool means, said actuator port is in communication with said passageway in said poppet means at said second end thereof, and said pressure port is in communication with said volume in said peripheral edge portions of said poppet means, and movement of said stem means in said first direction permits movement of said spool in said first direction to maintain said comparatively small flow rate, and allows said first comparatively large flow rate from said actuator port, through said passageway and into said reservoir port, and movement of said stem means in said second direction permits movement of said spool means in said second direction to maintain said comparatively small flow rate and to provide said seal between said spool means and said poppet means and said spool means moves said poppet means in said second direction to provide said second comparatively large flow rate between said pressure port and said actuator port.

10. The arrangement defined in claim 9 wherein said stem means is yieldingly biased into said first position.

11. The arrangement defined in claim 9 wherein said stem means is yieldingly biased into said second position.

12. The arrangement defined in claim 8 wherein said first port is a supply pressure port, said second port is a reservoir port, and said third port is an actuator port, and said reservoir port is in communication with said volume in said peripheral edge portions of said poppet means, said pressure port is in communication with said first portion of said second end of said spool means, and said predetermined portions of said second end of said spool means seals said first portion from said second portion thereof, and said actuator port is in communication with said passageway in said poppet means at said second end thereof, and movement of said stem means in said first direction permits movement of said spool means in said first direction to maintain said comparatively small flow rate, and allows said second comparatively large flow rate from said pressure port through said passageway in said poppet means to said actuator port, and movement of said step means in said second direction moves said spool means in said second direction to maintain said comparatively small flow rate and provides said seal between said spool means and said poppet means, and said spool means moves said poppet means in said section direction to provide said first comparatively large flow rate between said actuator port and said reservoir port.

13. The arrangement defined in claim 12 wherein said stem means is yieldingly biased into said first position.

14. The arrangement defined in claim 12 wherein said stem means is yieldingly biased into said second position.

15. An improved servo-control valve of the type having a valve body with a supply pressure port, a reservoir port and an actuator port, for allowing a predetermined small fluid flow rate between said pressure port and said reservoir port, a first comparatively large fluid flow rate between said actuator port and said reservoir port for displacement from a neutral position in a first direction into a first position and a second comparatively large fluid flow rate between said pressure port and said actuator port for displacement from said neutral position in a second direction opposite the first direction into a second position, comprising, in combination:

a stem means having a seal portion internal said valve body and actuator portion external said valve body and a cylindrical body member intermediate said seal portion and actuator portion, and said cylindrical body member having peripheral wall portions slidingly engaging said valve body for reciprocal motion therein, and said peripheral wall portions of said body member of said stem means having seal means thereon for sliding seal engagement with said valve body;

a cylindrical spool means slidingly mounted in said valve body for reciprocal motion in paths coaxial with said stem means and having peripheral wall portions slidingly engaging said valve body and said peripheral wall portions having sealing means thereon for sliding seal engagement with said valve body, and having a first end adjacent said seal portion of said stem means and a second end spaced therefrom, and said spool means having first walls defining an aperture providing a first fluid flow path therethrough from a first portion of said second end to said first end, and second walls defining a bleed orifice separate from said aperture providing a second fluid flow path therethrough from a second portion of said second end to said first end and said seal portion of said stem means spaced a preselected distance from said aperture to allow said comparatively small flow rate therethrough, and said first end of said spool means and preselected wall portions of said valve body defining a first chamber for receiving said comparatively small fluid flow rate from said bleed orifice and transmittal into said aperture past said seal portion of said stem means;

said reservoir port in communication with said first portion of said second end of said spool means;

a generally cylindrical poppet means having a first end, a second end, and peripheral wall portions slidingly engaging said valve body for reciprocal motion in paths colinear with said stem means, and said peripheral wall portions having sliding seal means for sliding seal engagement with said valve body, and said first end of said poppet means sealingly engaging preselected portions of said second end of said spool means to seal said second portion of said second end of said spool means from said first portion thereof and defining a second chamber therewith in the neutral and second positions, and spaced therefrom in said first position and said poppet means having first walls defining a fluid passageway therethrough, from said first end to said second end thereof and having second walls in said peripheral wall portions defining a fluid volume with said valve body and said volume sealed to prevent fluid flow therefrom in the first position, and said pressure port communicating with said volume, and said actuator port communicating with said passageway adjacent said second end of said poppet, and said volume providing said comparatively small fluid flow rate from said pressure port, through said passageway, into said second chamber, through said bleed orifice, into said first chamber through said aperture and into said reservoir port in said neutral position, said spool means adapted to move in said first direction to said first position for movement of said stem means in said first direction to maintain said preselected spacing from said seal portion of said stem means and said movement in said first direction of said spool means provides communication between said second chamber and said reservoir port for said first comparatively large flow rate from said actuator port through said passageway to said second chamber and to said reservoir port;

and said spool means adapted to move in said second direction to said second position for movement of said stem means in said second direction to maintain said preselected spacing from said seal portion of said stem means and for movement of said spool means in said second direction said spool means engages said poppet means and moves said poppet means in said second direction to said second position to allow said second comparatively large flow rate from said pressure port to said fluid volume to said actuator port.

16. Arrangement defined in claim 15 wherein stem means further includes a portion extending through said aperture in said spool means, through said second chamber, through said passageway to regions external said valve body.

17. An improved servo-control valve, comprising, in combination:

a valve body having a pressure port, a reservoir port and an actuator port, a stem means slidingly mounted in said valve body and having a seal portion internal said valve body;

a spool means slidingly mounted in said valve body and adapted to move with said stem means to maintain said first end of said spool means spaced a first preselected distance from said seal portion of said stem means;

and a poppet means slidingly mounted in said valve body and sealingly engaging a second end of said spool means in a neutral position and a second position, and spaced therefrom in a first position;

and means for allowing:
fluid flow at said predetermined small fluid flow rate between said reservoir port and said pressure port through said poppet means and said spool means,
a first comparatively large flow rate from said actuator port to said reservoir port through said poppet means in said second position,
and a second comparatively large flow rate between said pressure port and said actuator port in said second position.

18. An improved servo-control valve of the type having a valve body with a supply pressure port, a reservoir pressure port and an actuator port, for allowing a predetermined small fluid flow rate between said pressure port and said reservoir port, a first comparatively large fluid flow rate between said pressure port and said actuator port for displacement from a neutral position in a first direction into a first position, and a second comparatively large fluid flow rate between said actuator port and said reservoir port for displacement from said neutral position in a second direction opposite said first direction into a second position, comprising, in combination:

a stem means having a seal portion internal said valve body and an actuator portion external said valve body, and a cylindrical body member intermediate said seal portion and said actuator portion, and said cylindrical body member having peripheral wall portions slidingly engaging internal wall portions of said valve body for reciprocal motion therein, and said peripheral wall portions of said body member of said stem means having seal means thereon for sliding seal engagement with said valve body;

a cylindrical spool means slidingly mounted in said valve body for reciprocal motion in paths coaxial with said stem means and having peripheral wall portions slidingly engaging internal wall portions of said valve body and said peripheral wall portions of said spool means having seal means thereon for sliding seal engagement with said internal wall portions of said valve body, and said spool means having a first end adjacent said seal portion of said stem means and a second end spaced therefrom, and having first walls defining an aperture providing a first fluid flow path therethrough from a second portion of said second end of said spool means to said first end of said spool means, and second walls defining a bleed orifice, separate from said aperture, said aperture providing a second fluid flow path therethrough from a first portion of said second end to said first end of said spool means, and said seal portion of said stem means spaced a preselected distance from said aperture to allow said comparatively small fluid flow rate therethrough, and said first end of said spool means and preselected internal wall portions of said valve body defining a first chamber for receiving said comparatively small fluid flow rate from said bleed orifice and transmittal thereof into said aperture past said seal portion of said stem means;

and said pressure port in communication with said first portion of said second end of said spool means;

a generally cylindrical poppet means having a first end, a second end and peripheral wall portions therebetween for slidingly engaging internal wall portions of said valve body for reciprocal motion in paths colinear with said stem means, and said peripheral wall portions having sliding seal means thereon for sliding seal engagement with said internal wall portions of said valve body, and said first end of said poppet means sealingly engaging preselected portions of said second end of said spool means to seal said second portion of said second end of said spool means from said first portion thereof in said neutral and said second positions, and spaced therefrom in said first position, and said poppet means having first walls defining a fluid passageway therethrough from said first end to said second end thereof, and having second walls in said peripheral wall portions defining a fluid volume with said internal wall portions of said valve body, and said volume sealed to prevent fluid flow therefrom in the first position, and said reservoir port communicating with said volume, and said actuator port communicating with said passageway adjacent said second end of said poppet, and said pressure port providing said comparatively small fluid flow rate through said bleed orifice in said spool means to said second chamber, through said passageway in said poppet means and into said volume for flow to said reservoir port in said neutral position;

said spool means adapted to move in said first direction to said first position for movement of said stem means in said first direction to said first position to maintain said preselected spacing from said seal portion, and said movement of said spool means in said first direction provides communication between said second chamber and said pressure port for said first comparatively large fluid flow rate from said pressure port into said second chamber through said passageway in said poppet means and to said actuator port, and said spool means adapted to move in said second direction to said second position for movement of said stem means in said second direction to maintain said preselected spacing from said seal portion of said stem means and for movement of said spool means in said second direction, said spool means engages said poppet means and moves said poppet means in said second direction to said second position to allow said second comparatively large flow rate from said actuator port to said reservoir port.

19. The arrangement defined in claim 18 wherein said stem means further includes a portion extending through said aperture in said spool means, through said second chamber, through said passageway in said poppet means and extends to regions external said valve body.

References Cited
UNITED STATES PATENTS

| | | | |
|---|---|---|---|
| 2,625,136 | 1/1953 | Moog | 137—625.61 |
| 2,910,050 | 10/1959 | Dotter et al. | 137—625.66 |
| 2,989,987 | 6/1961 | Hayner | 137—625.61 |
| 3,217,745 | 11/1965 | Tate | 137—625.68 XR |

HENRY T. KLINKSIEK, *Primary Examiner.*